United States Patent
Anderson et al.

(10) Patent No.: US 10,726,154 B2
(45) Date of Patent: Jul. 28, 2020

(54) DETECTING PERSONAL THREAT DATA IN DOCUMENTS STORED IN THE CLOUD

(71) Applicants: Matthew Anderson, Issaquah, WA (US); Michael McCracken, Seattle, WA (US); Phillip Wilt, Seattle, WA (US); Brandon Caplan, Mercer Island, WA (US); Ryan Graham, Lynnwood, WA (US); Charles Mount, Issaquah, WA (US)

(72) Inventors: Matthew Anderson, Issaquah, WA (US); Michael McCracken, Seattle, WA (US); Phillip Wilt, Seattle, WA (US); Brandon Caplan, Mercer Island, WA (US); Ryan Graham, Lynnwood, WA (US); Charles Mount, Issaquah, WA (US)

(73) Assignee: Onehub Inc., Seattle, WA (US)

( * ) Notice: Subject to any disclaimer, the term of this patent is extended or adjusted under 35 U.S.C. 154(b) by 230 days.

(21) Appl. No.: 15/806,641

(22) Filed: Nov. 8, 2017

(65) Prior Publication Data

US 2019/0138747 A1   May 9, 2019

(51) Int. Cl.
   *G06F 21/00*   (2013.01)
   *G06F 21/62*   (2013.01)
   *H04L 29/08*   (2006.01)

(52) U.S. Cl.
   CPC ...... *G06F 21/6254* (2013.01); *H04L 67/1097* (2013.01); *H04L 67/20* (2013.01)

(58) Field of Classification Search
   CPC . G06F 21/6254; H04L 67/20; H04L 67/1097; H04L 63/083; H04L 63/1433; H04L 63/0245
   See application file for complete search history.

(56) References Cited

U.S. PATENT DOCUMENTS

| | | | |
|---|---|---|---|
| 8,677,448 B1 * | 3/2014 | Kauffman | G06F 21/604 726/1 |
| 9,716,724 B1 * | 7/2017 | Chennuru | H04L 63/1433 |

(Continued)

OTHER PUBLICATIONS

Hoi Ting Poon, Scanning for Viruses on Encrypted Cloud Storage, 2016, Intl IEEE Conferences on Ubiquitous Intelligence & Computing, (Year: 2016).*

*Primary Examiner* — John B King
(74) *Attorney, Agent, or Firm* — Law Office of R. Alan Burnett, PS; R. Alan Burnett (57) ABSTRACT

Methods, systems, and software for identifying threat data in documents stored in cloud-based storage services. A service is provided that enables users who store documents on cloud-based storage services to have their documents scanned for threat data comprising personal and/or confidential data such as social security numbers, credit card numbers, e-mail addresses, and phone numbers. The documents are streamed from the storage services and scanned to detect one or more types of personal threat data. The detected personal threat data are then presented to users in redacted form. Detecting and presentation of personal threat data is performed in a manner under which threat data is never stored in non-volatile storage in an un-redacted form. A Web service seamlessly enables users to request their documents to be scanned for personal threat data, view detected personal threat data in redacted forms, and access documents identified as containing personal threat data.

21 Claims, 9 Drawing Sheets

(56) References Cited

U.S. PATENT DOCUMENTS

| | | | |
|---|---|---|---|
| 2004/0230576 A1* | 11/2004 | Hillberg | G06F 16/116 |
| 2009/0254572 A1* | 10/2009 | Redlich | G06Q 10/06 |
| 2010/0250497 A1* | 9/2010 | Redlich | F41H 13/00 |
| | | | 707/661 |
| 2012/0117123 A1* | 5/2012 | Geagan, III | H04L 9/0836 |
| | | | 707/797 |
| 2013/0311612 A1* | 11/2013 | Dickinson | H04L 67/1097 |
| | | | 709/219 |
| 2014/0007186 A1* | 1/2014 | Agrawal | G06F 21/60 |
| | | | 726/1 |
| 2014/0013434 A1* | 1/2014 | Ranum | H04L 63/145 |
| | | | 726/24 |
| 2014/0026182 A1* | 1/2014 | Pearl | G06F 21/60 |
| | | | 726/1 |
| 2014/0280559 A1* | 9/2014 | Torgersrud | H04L 63/102 |
| | | | 709/204 |
| 2015/0007264 A1* | 1/2015 | Maldaner | G06F 21/6218 |
| | | | 726/3 |
| 2015/0040237 A1* | 2/2015 | Vandervort | G06F 21/6254 |
| | | | 726/26 |
| 2015/0172120 A1* | 6/2015 | Dwarampudi | H04L 67/1097 |
| | | | 709/221 |
| 2015/0195406 A1* | 7/2015 | Dwyer | H04M 3/42221 |
| | | | 379/265.07 |
| 2016/0246996 A1* | 8/2016 | Khoo | G06F 16/00 |
| 2016/0364163 A1* | 12/2016 | Kamble | G06F 3/0622 |
| 2017/0006065 A1* | 1/2017 | Kamble | H04L 63/20 |
| 2017/0054791 A1* | 2/2017 | Hadfield | H04L 67/06 |
| 2017/0091482 A1* | 3/2017 | Sarin | G06F 21/6245 |
| 2019/0026494 A1* | 1/2019 | Smith | G06F 21/6254 |
| 2019/0104124 A1* | 4/2019 | Buford | H04L 63/10 |
| 2019/0138748 A1* | 5/2019 | Long | G06F 21/6254 |
| 2019/0377901 A1* | 12/2019 | Balzer | G06F 21/6254 |

* cited by examiner

| FILENAME 504 | PATH 506 | SIZE 508 | SHARED 510 | THREATS 512 |
|---|---|---|---|---|
| admin only.pdf 520 | / | 30.69KB | | 6 |
| admin2all.pdf 522 | /One Marshal Team Folder/ 514 | 68.39KB | 516 (typ) | 4 |
| admin2bean counters.pdf 524 | / | 71.46KB | | 3 |
| admin2manager.pdf 526 | / | 68.1KB | 517 | 4 |
| admin2worker.pdf 604 | / | 69.96KB | | 4  518-5 |

| TYPE 602 | MATCH | CONTEXT 606 | PAGE 608 |
|---|---|---|---|
| CC 610 | **********7489 618 | ...**********7489 Cause explosive... 626 | 1 |
| PHONE 612 | (*)*-0812 620 | ...(*)*-0812... 628 | 1 |
| SSN 614 | *--3107 622 | ...actors-Acting Unit 0.8,*--3107 630 Thespomat... | 2 |
| EMAIL 616 | msh...@go...de 624 | ...Belligerent and numerous.msh...@go...de It must be 632 wonderful. Oh,... | 2 |

FILTERED THREATS
802 → 145

| FILENAME 504 | PATH 506 | SIZE 508 | SHARED 510 | THREATS 512 |
|---|---|---|---|---|
| admin_only.pdf 520 528 (typ) | / | 30.69KB | | ② > |
| admin2all.pdf 522 | /One Marshal Team Folder/ 514 | 68.39KB | 👥 516 (typ) | ② > |
| admin2bean counters.pdf 524 | / | 71.46KB | 👥 | ② > |
| admin2manager.pdf 526 | / | 68.1KB | 🔗 517 | ② > 518 (typ) |

*Fig. 8*

800

US 10,726,154 B2

DETECTING PERSONAL THREAT DATA IN DOCUMENTS STORED IN THE CLOUD

BACKGROUND INFORMATION

The use of cloud-based storage services has rapidly expanded in the past few years. Use of storage services such as DROPBOX®, GOOGLE DRIVE®, MICROSOFT ONEDRIVE®, BOX®, APPLE ICLOUD®, etc., and others has become ubiquitous for many users. Cloud-based storage provides a number of benefits, such as universal access (files are accessible from substantially any device with Internet access), automatic replicated back-ups, and sharing, which enables documents to be shared across groups of users. Both GOOGLE® and MICROSOFT® also provide cloud-based editing of documents under which multiple users can concurrently edit the same document.

While the benefits of Cloud-based storage are many, there are also drawbacks. Most significant is there is no way to guarantee that documents stored in the cloud cannot be accessed by hackers. Although hacking instances are rare, hackers develop ever-more sophisticated techniques for breaking into (allegedly) secure data stores and the like, as evidenced by attacks on large companies such as YAHOO®, including a hack in 2013 that assessed 500 million YAHOO® user accounts. Since then, YAHOO® has deployed state-of-the-art security measures, yet hackers have still been able to breach these barriers, including hacks in 2016 and 2017.

File sharing via cloud-based storage services creates an additional problem. For example, DROPBOX® employs a local DROPBOX® application that syncs with storage of documents in DROPBOX® data centers. Access to "local" DROPBOX® folders are seamlessly supported by MICROSOFT WINDOWS® and APPLE® OS X operating systems, enabling users to access the folders in the same manner as other folders. At the same time, when documents are added to a DROPBOX® folder or an existing document is saved, the added document and/or updated version of an existing document is saved to the DROPBOX® cloud. The result of this functionality is that when a document is shared, a copy of the document is not only maintained in a DROPBOX® data center, but each user who the DROPBOX® document or folder containing the document is shared with will have a local copy of the document on his or her machine (or in many cases, on multiple machines). As a result, if any of the user machines is hacked, it is possible that a copy of any shared document might be accessed. Moreover, since most users do not use built-in encryption functionality provided by operating systems such as WINDOWS BITLOCKER® and APPLE's FILEVAULT®, the documents are stored "in the clear," meaning documents accessed by a hacker can be easily read.

In many instances, documents stored in the cloud and/or shared with others via a cloud-based storage service may include personal and/or confidential data, such as social security numbers, credit card numbers, e-mail addresses, and phone numbers. As used herein, the personal and/or confidential data, as well as other types of sensitive data, private data and personally identifiable data are referred to as "personal threat data" or "threats." Oftentimes, users are unaware of the existence of such personal threat data within their documents. Additionally, they may be unaware that documents they have shared contain personal threat data. In some cases, users inadvertently share the wrong folders and/or share folders with people they did not intend to share the folders with, exposing personal threat data to these users.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods, systems and software for identifying personal threat data in documents stored in cloud-based storage services are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, techniques and mechanisms are provided that enable users of cloud-based storage services to easily identify threats in their documents stored on the storage services. Documents stored on one or more cloud-based storage services are scanned for one or more types of threats selected by the user. Redacted information related to the threats is generated and used to present information to the user via an intuitive Web-based interface to enable the user to easily identify what threats exist in what documents. Users are further enabled to access the documents to view them and/or edit them to remove the treat data in a seamless manner without requiring the user to log into any of the one or more cloud-based storage services.

Figure 1:
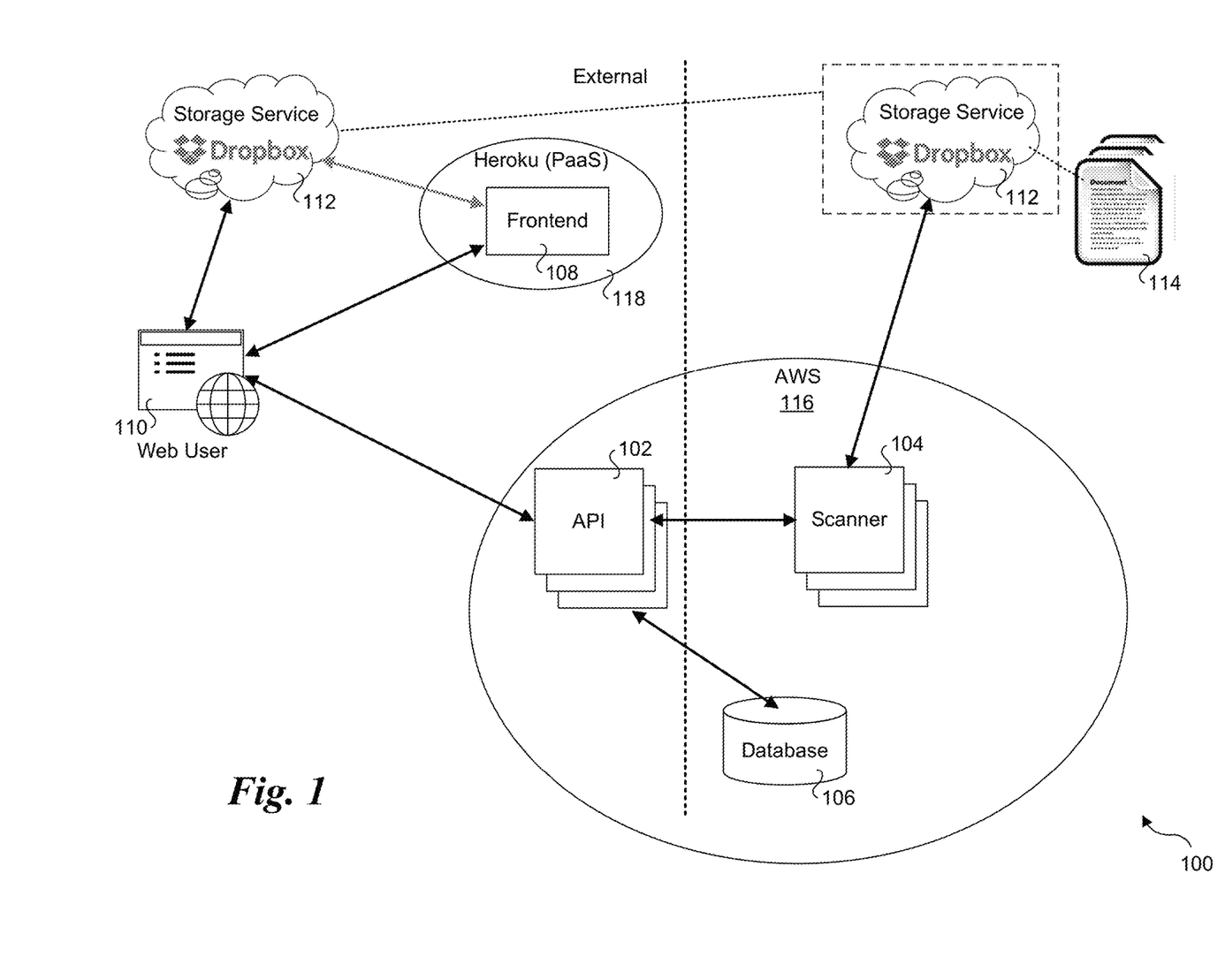
FIG. 1 is an architecture diagram illustrating an overview of selected components for implementing a threat detection system, according to one embodiment.

An overview of selected components for implementing one embodiment of the threat detection system is depicted in an architecture 100 of FIG. 1. The selected components of architecture 100 include multiple instances of an API (Application Program Interface) 102, multiple instances of a scanner 104, a database 106, a front end 108 used to facilitate generation of Web pages 110, and a Storage Service 112 storing multiple documents 114. In one embodiment, APIs 102, scanner 104, and database 106 are part of a cloud-hosted service that is accessible over the Internet as a Web service or the like. In the illustrated embodiment, the cloud-hosted service is implemented using servers and infrastructure provided by AMAZON® Web Services (AWS) 116, a well-known Infrastructure as a Service (IaaS) and Platform as a Service (PaaS) provider. AWS supports scalable deployment of Web services and other types of on-line services using servers and associated network infrastructure at several large data centers located in the United States and around the world. AWS provides IaaS and PaaS resources that are available for lease. In other embodiments, other cloud-based IaaS and PaaS service providers may be used. Optionally, the scanner service may be hosted by a service provider using dedicated hardware that is not leased from a third-party.

Frontend 108 is used to generate (or assist in generating) various Web pages 110 that enable Web users to access the scanner services and view threat scanning results. Generally, frontend 108 provides similar functionality to what may be commonly implemented in a Web server tier in an N-tier deployment, such as a deployment having a Web server tier, one or more application/services tiers, and a backend tier. In the illustrated embodiment, the frontend is implemented using PaaS 118 resources provided by HEROKU®. HEROKU® is a cloud platform (PaaS) that facilitates building, deploying, and scaling Web applications. Like AWS, HEROKU® is hosted on AMAZON® data centers. As an option, the frontend component may be implemented using AMAZON® Elastic Beanstalk. Alternatively, an entire N-tier deployment of selected tiers in a deployment may be implemented on private infrastructure or using other IaaS and/or PaaS service providers, such as MICROSOFT® (AZURE®) or GOOGLE® (GOOGLE® Cloud Platform).

In the embodiment illustrated in FIG. 1, the Storage Service 112 is DROPBOX®. DROPBOX® is a well-known cloud-based storage service that is accessible via the Internet and enables users to store documents and other artifacts on DROPBOX's cloud-based storage facilities. DROPBOX® also has a local application (e.g., DROPBOX® Windows application or DROPBOX® Mac OS X application), that runs locally and syncs versions of files on a local device (e.g., PC or laptop) with files stored in the cloud. It will be recognized that the use of DROPBOX® herein is exemplary and non-limiting, as similar deployment patterns may be used for other cloud-based storage services, including but not limited to GOOGLE DRIVE®, MICROSOFT ONEDRIVE®, APPLE ICLOUD®, BOX®, SPIDEROAK®, IDRIVE®, MEGA®, SUGARSYNC®, and PCLOUD®. As used in the claims herein, these are referred to as "third-party" cloud-based storage services to indicate the threat scanning operations are performed by an entity that is separate from any of the cloud-based storage services; for convenience, the terminology "cloud-based storage service(s)" is used in this detailed description.

An overview of scanner service operations, according to one embodiment, are now described with reference to the architecture diagram of FIG. 1a and a flowchart 200 shown in FIG. 2. Each of FIGS. 1a and 2 include encircled numbers that correspond to operations shown adjacent to the encircled numbers in flowchart 200.

The process begins in a block 202, in which a Web page is generated to enable user access to the scanner service and served to a user's client device, such as a PC, laptop, smartphone, or tablet. In one embodiment, the Web page includes a login form or the like in which a user enters login credentials for the scanner service, such as a username and password. In some embodiments, the user may have a persistent login, under which the user logs in once (or periodically), and when the Web page is accessed the user is already logged in. In a preferred embodiment, communication between the clients and servers employed HTTPS. Optionally, other secure network transport schemes may be used.

In a block 204, the user is enabled to enter login credentials for a storage service on which the documents to be scanned are stored. In one embodiment, the user enters login credentials a first time for a given storage service, and those login credentials are persisted across a current session and future sessions. Optionally, a user may be required to enter at least a password for each session. An extra authentication level may also be employed, depending on the storage service's policies and/or implementation. For example, user's accessing documents stored on ICLOUD® may be presented with a text message containing a code that need to be entered to authenticate the user. During a single or multiple setup operations, a user may enter the login credentials for one or more storage services in a similar manner.

In a block 206, the user login credentials are used to authenticate and authorize the user with the storage service. Generally, this would be similar to the user entering login credentials directly via a Web site for the storage service, but rather than have the user enter the credentials, the scanner service does so, operating as a proxy for the user. Generally, most storage services provide an API (or set of APIs) to enable access to data that is stored by the storage service. For example, in the case of DROPBOX®, an API is provided to enable Web access over HTTPS. In one embodiment, a DROPBOX® user authentication API is used under which the username and password is passed to DROPBOX® via the API using the OAuth 2.0 protocol. In response, if the logic credentials are valid, the user authentication API returns an OAuth2 token, which is depicted as an access token 120 in FIG. 1a.

During a fourth operation depicted in a block 208, a scanner service request, including the access token, is forwarded to one of the API instances 102. Optionally, as described below, API instances may implement a polling process under which they poll for any available work. Further details of the scanner service request are also described below.

In a block 210, the scanner service request is initially processed and a scanner service request with associated parameters and the access token is submitted to a scanner instance 104. As before, a scanner instance may implement a polling scheme under which scanner instances poll for work available from API instances 102. Generally, the associated parameters may identify one or more of types of documents to scan (which may include a list of one or more specific types of files to scan, or a request to scan all documents, for example) and/or may specify what "threats" to scan for. As used herein a "threat" corresponds to a piece of data that may be a threat to the user if exposed to a third-party, such as a hacker. A non-limiting set of threats include social security numbers, phone numbers, credit card numbers, bank account numbers, e-mail addresses, etc. Generally, the associated parameters may include a list of one or more threats, may identify all threats, or may otherwise be coded to identify groups of threats. For example, there may be one or more levels of threat "filtering" the scanner service provides, wherein a given level of threat filtering may be specified using a corresponding parameter.

During a sixth operation depicted in a block 212, the scanner instance submits an access request along with the access token to the storage service API. Generally, the access request will correspond to the parameters that were previously passed to the scanner instance. DROPBOX®, as well as other storage service providers, expose API's that enable various clients to access documents stored on DROPBOX®. For example, a typical access request might include an access token corresponding to a particular user, and the request may be used to access selected documents or all documents for the user, depending on parameters provided with the request.

In a seventh operation, content corresponding to one or more documents is streamed from the storage service to the scanner instance, as shown in a block 214. In one embodiment, the document(s) is/are streamed using an HTTPS streaming protocol. Under HTTPS, the document content is encrypted on the sender side (e.g., at a first Web server for the cloud-based storage service), streamed as encrypted content, and then unencrypted on the receiver side (e.g., at second Web server or similar front-end component). Other types of streaming mechanisms may also be implemented, such as those known in the art.

As the content is streamed, one or more scanner instances are used to parse and/or process the streamed content to identify personal threat data, as shown in a block 216. This process is discussed in detail below. Generally, one or more types of personal threat data will be scanned for, using various mechanisms for identifying instances of those types of personal threat data in the streamed content. Significantly, this process is performed as the streamed content is received without ever storing the documents on the scanner service infrastructure.

In a block 218, the scanner instance(s) send redacted threat information including data identifying the location of the personal threat data to an API instance 102. As described below, the redacted threat information identifies selected portions of a document that includes one or more instances of personal threat data, wherein a selected portion generally contains surrounding context (e.g., a snippet of surrounding text) that may be used to enable a user to identify the location of the personal threat data within a given document. For example, for a scanner that detects threats comprising social security numbers, a selected portion of a document might include a sentence or sentence fragment containing a social security number or other content including a social security number, such as a portion of a tax return including the social security number. Further details of scanner operations and examples of redacted threat information are described below.

The scanner sends the redacted threat information to an API instance 102. Under aspects of embodiments herein, all or a portion of an instance of detected personal threat data is redacted prior to storing any of the selected portions of the document(s) in database 106 or otherwise presenting corresponding content to the user via a Web page. Generally, the redaction may be implemented by the scanner, by the API, or a combination of the two. Since both the scanner instances and API instances are operating in memory on the AWS infrastructure, a hacker would need to access that memory in order to extract any personal threat data that has yet to be redacted. Under the secure virtualization schemes implemented by AWS, this would be a very small threat, albeit theoretically possible. Under one embodiment, a pointer to a context object containing the selected portion of the document that contains one or more instances of personal threat data (in redacted form) is passed from the scanner to the API. In other embodiments, the context object itself is passed from the scanner to the API (e.g., passed by reference). Further details and examples of the redaction process are provided below.

Figure 1A:
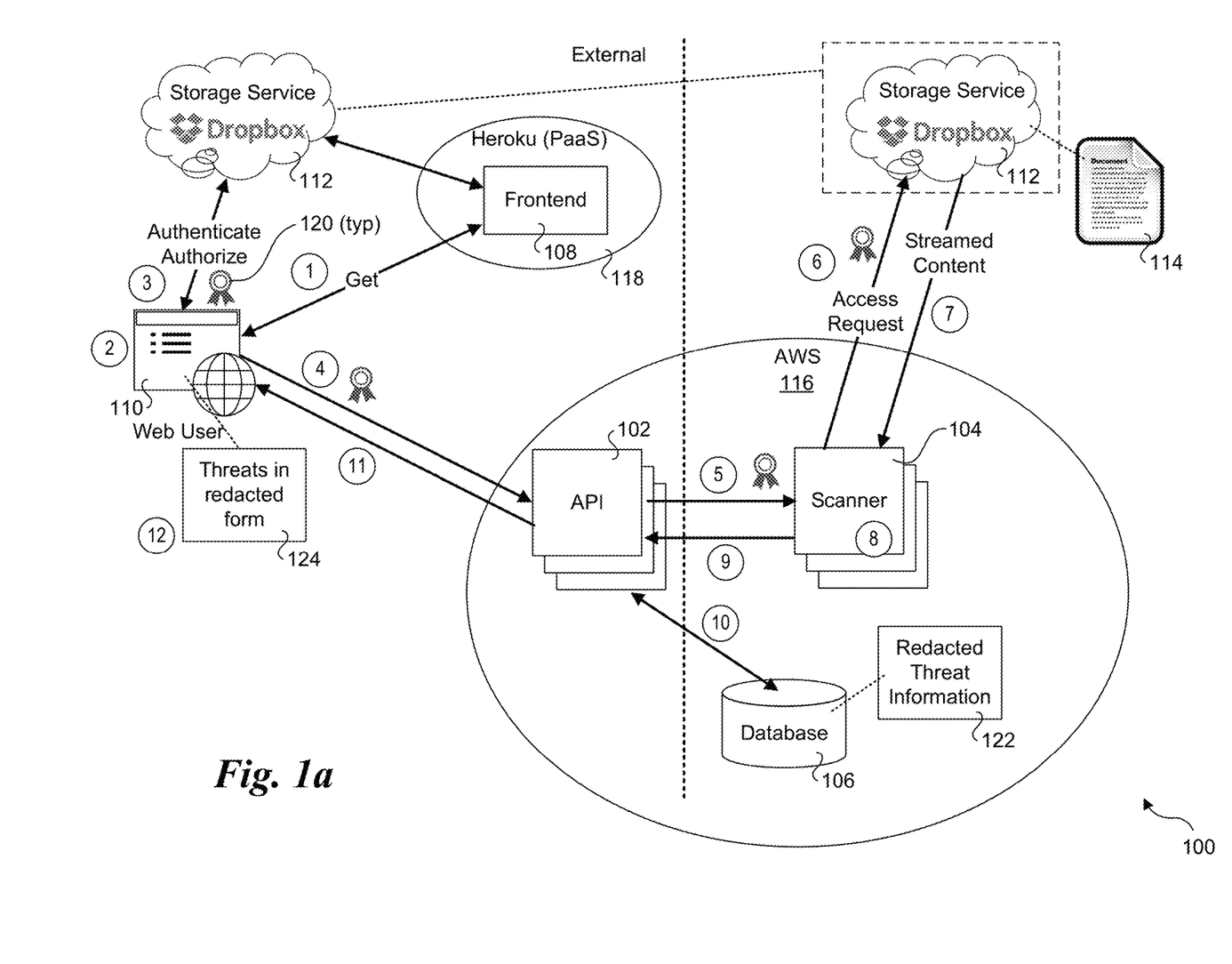
FIG. 1a is a schematic diagram showing further details of the architecture diagram of Figure, including communication flows for implementing a threat scanning processor in accordance with the flowchart of FIG. 2.
Figure 2:
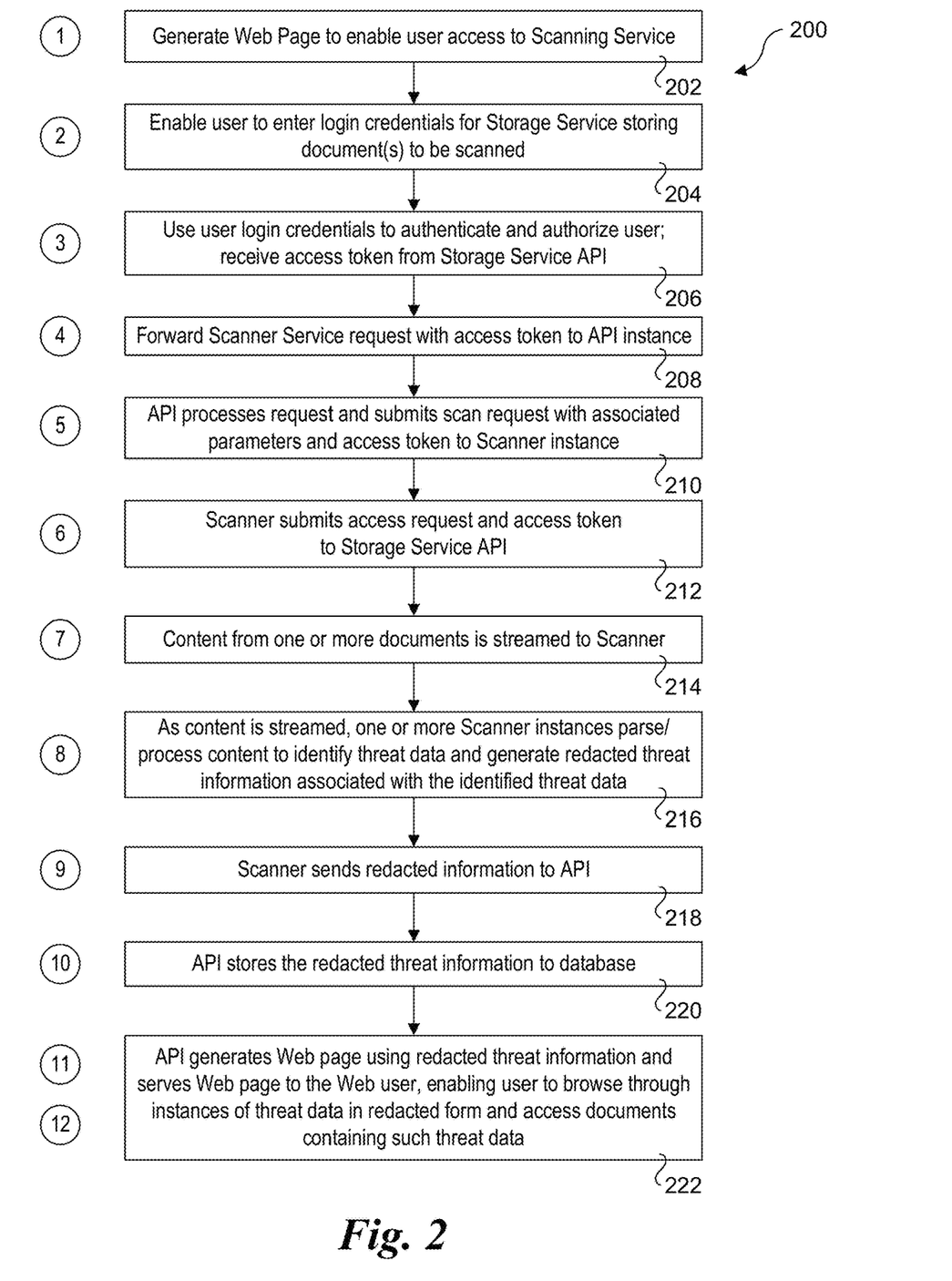
FIG. 2 is a flowchart illustrating operations for implementing a threat scanning and presentation processes using the architecture of FIGS. 1 and 1a, according to one embodiment.

In a block 220, the API stores the redacted threat and location information to database 106, as illustrated by redacted threat information 122 in FIG. 1a. The process is completed in a block 222, in which the API uses the redacted threat information to generate a Web page and serves the Web page to the Web user including representations of threats in redacted form, as depicted by threats in redacted form 124 in FIG. 1a. Further details of Web pages that enable users to review detected threats (in redacted form) and access documents containing the detected threats are discussed below.

In one embodiment, the redacted threat information 122 includes the following:

Type: whether the threat has been identified as a SSN, credit card number, e-mail address, phone number, etc.

File: a link to and the name of the file containing the threat.

Location: the exact page, sheet, etc., the threat is found on.

Surrounding Text: the text immediately before and after the threat; any threats here will also be redacted.

Shared Data: whether or not the file is being shared with another person and/or if it is accessible via an obscured link.

Threat Fragment: a non-identifiable version of the threat, for example, the last four digits of a SSN.

Figure 3:
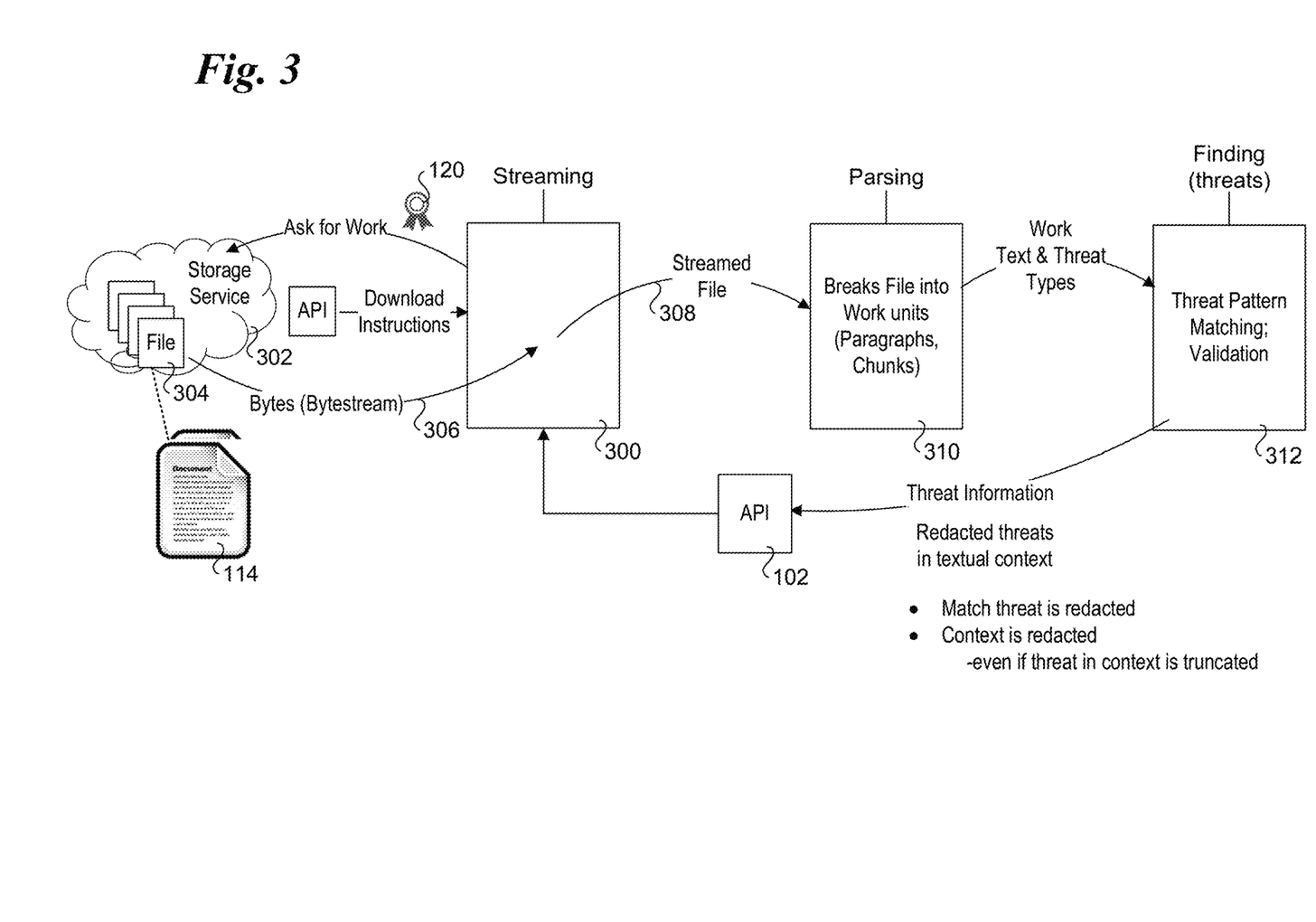
FIG. 3 is a combination architecture and data flow diagram illustrating components and associated operations for detecting threats in documents access from a cloud-based storage service.

FIG. 3 shows further details of one embodiment of the processing performed by scanner 104 and associated components. As illustrated, the process begins with an API instance providing downloading instructions to a streaming component 300. Streaming component 300 then asks for work (i.e., a file's content) from a cloud storage service, as depicted by a document 114 stored in a cloud-based storage service 302 on which a plurality of files 304 are stored. Streaming component uses access token 120 to access files 304, streaming each file one at a time, as depicted by Bytestream 306 and streamed file 308. As the Bytestream is received, it is processed by a parsing component 310. The parsing component identifies the file type and breaks the file into work units comprising paragraphs and/or chunks.

The work unit (paragraph or chunk), along with information regarding the work's location in the file and threats to be scanned for are processed by a threat finding block 312. Generally, threats are found through the use of pattern matching. In one embodiment, patterns comprising a "regular expression," also known as a regex or regexp, are used.

Regexes are supported by various programming language and libraries, and are well-known in the art. At a basic level, a regex processor translates a regex into an internal representation that is used by an application to pattern-match text strings in the file or document being scanned. Typically, one or more regexes can be generated for each type of threat for which detection has been requested. For example, the regex for a social security number with dashes in some languages is fairly straightforward:

A\d{3}-\d{2}-\d{4}$

Or without dashes:

^\d{9}$

Similar regex patterns may be used for each of credit card numbers, e-mail addresses, and phone numbers. It is noted that the exemplary regexes herein are designed to be used for specific languages and/or libraries, while regexes are readily available for other languages.

The use of the regex patterns, alone, will generally result in false positives—that is a match is detected, but the matching data is not valid for the type of personal threat data. To filter out the false positives, a validation operation is also performed. For example, a social security number comprises a three digit Area Number, followed by a two digit Group Number, followed by a four digit Serial number. Normally, an SSN is written with dashes between the three numbers. None of the Area, Group, or Serial number can contain all zeros, the Area Number can't be '666, or be any value from '900-000', and the SSN can't be either of '078-05-1120' (number of a Social Security card distributed in wallets sold through WOOLWORTH® stores) or '219-09-9999' (used by Social Security Administration advertising).

The credit card numbers are a sequence of 13 to 16 digits, with specific digits at the start used to identify the card issuer. Physical credit cards include a specific pattern of digits with spaces, such as 4### #### #### #### for newer VISA® cards. However, when written into documents by users, credit card numbers may generally be written with spaces, with dashes, or as a sequence of digits with no spaces or dashes. Accordingly, separate regexes may be used to match strings with corresponding patterns using each of spaces, dashes, or a 13 to 16 digit sequential number. To verify more-specific credit card information, more-specific regexes may be used, such as regexes for matching patterns to VISA®, MASTERCARD®, AMERICAN EXPRESS®, DISCOVER®, DINERS CLUB®, etc. In this case, the Regex (or set of Regexes) can be specifically designed to match the pattern of the particular type of credit card. To further prevent false positives on credit card numbers, a validation operation is performed that verifies the numbers are presented in a format common to the type of credit card it is. For example, formatted 19 digit credit card numbers usually come as "##### ########### ###" or "#####-###########-###."

Detection of email addresses can also be done with a regex, such as the following general email regex for RFC 5322 (this example is for Java):

```
(?:[a-z0-9!#$%&'*+/=?^_`{|}~-]+(?:\.[a-z0-9!#$%&'*+/=?^_`{|}~-]+)*|"(?:[\x01-\x08\x0b\x0c\x0e-\x1f\x21\x23-\x5b\x5d-\x7f]|\\[\x01-\x09\x0b\x0c\x0e-\x7f])*")@(?:(?:[a-z0-9](?:[a-z0-9-]*[a-z0-9])?\.)+[a-z0-9](?:[a-z0-9-]*[a-z0-9])?\|[(?:(?:25[0-5]|2[0-4][0-9]|[01]?[0-9][0-9]?)\.){3}(?:25[0-5]|2[0-4][0-9]|[01]?[0-9][0-9]?|[a-z0-9-]*[a-z0-9]:(?:[\x01-\x08\x0b\x0c\x0e-\x1f\x21-\x5a\x53-\x7f]|\\[\x01-\x09\x0b\x0c\x0e-\x7f])+)\])
```

By comparison, the following accomplishes a similar (albeit not identical for all input) result in Python:

r"(^[a-zA-Z0-9_.+-]+@[a-zA-Z0-9-]+\.[a-zA-Z0-9-.]+$)"

Depending on the type of document, phone numbers are generally more difficult to match than SSNs, credit card numbers, or email addresses. The reason for this is that phone numbers can vary in length depending on the country, since different countries use different formats, and people write out phone numbers in documents with spaces and/or dashes, parenthesis, or none at all. This is particularly difficult in documents containing numerical data, such as spreadsheets.

Generally, a similar approach to that described above (regex, followed by validation) may be used for phone numbers. Alternatively, schemes may be used to look for specific types of phone numbers, such as US-only phone numbers. This simplifies the regexes and also enables validation to be performed by comparing the pattern to know area codes and prefixes. In one embodiment, a repository of known phone numbers is used (via an applicable API or library), such as available from GOOGLE®.

Figure 4:
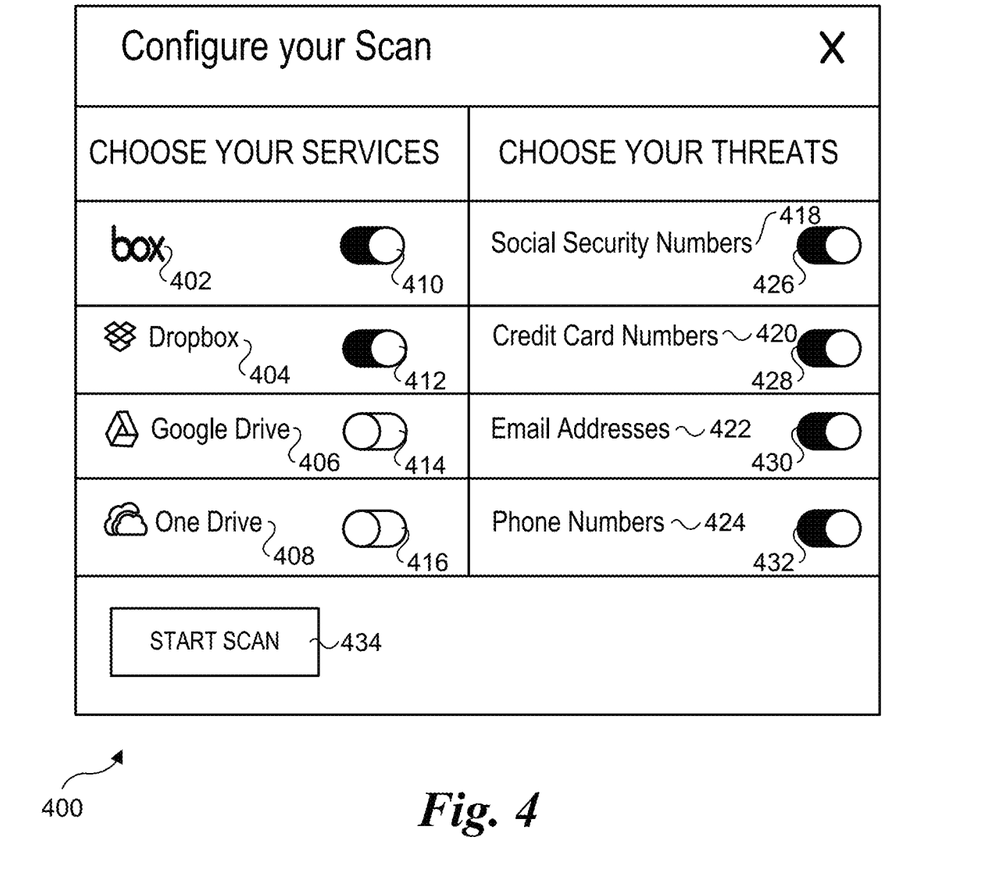
FIG. 4 shows a dialog box that enables a user to configure a scan, according to one embodiment.

FIG. 4 shows an exemplary scan configuration dialog box 400 used for configuring scans, according to one embodiment. A user is enabled to select one or more services to scan, as illustrated by a BOX® service 402, a DROPBOX® service 404, GOOGLE DRIVE® service 406, and ONEDRIVE® service 408, by turning one of the on/off controls adjacent to each service, as depicted by on/off controls 410, 412, 414, and 416. In the example shown in FIG. 4, BOX® service 402 and DROPBOX® service 404 have been selected for scanning (on/off controls 410 and 412 are on), while GOOGLE DRIVE® service 406, and ONEDRIVE® service 408 have not been selected (on/off controls 414 and 416 are off).

The user is also enabled to select what threats to scan for, including social security numbers 418, credit card number 420, Email addresses 422, and Phone numbers 424. As before, one or more of these threats will be included in the scan depending on whether its on/off control is set to on or off, as depicted by on/off controls 426, 428, 430, and 432 (all set to on). The scan will start in response to selection of the Start Scan button 434.

Figure 5:
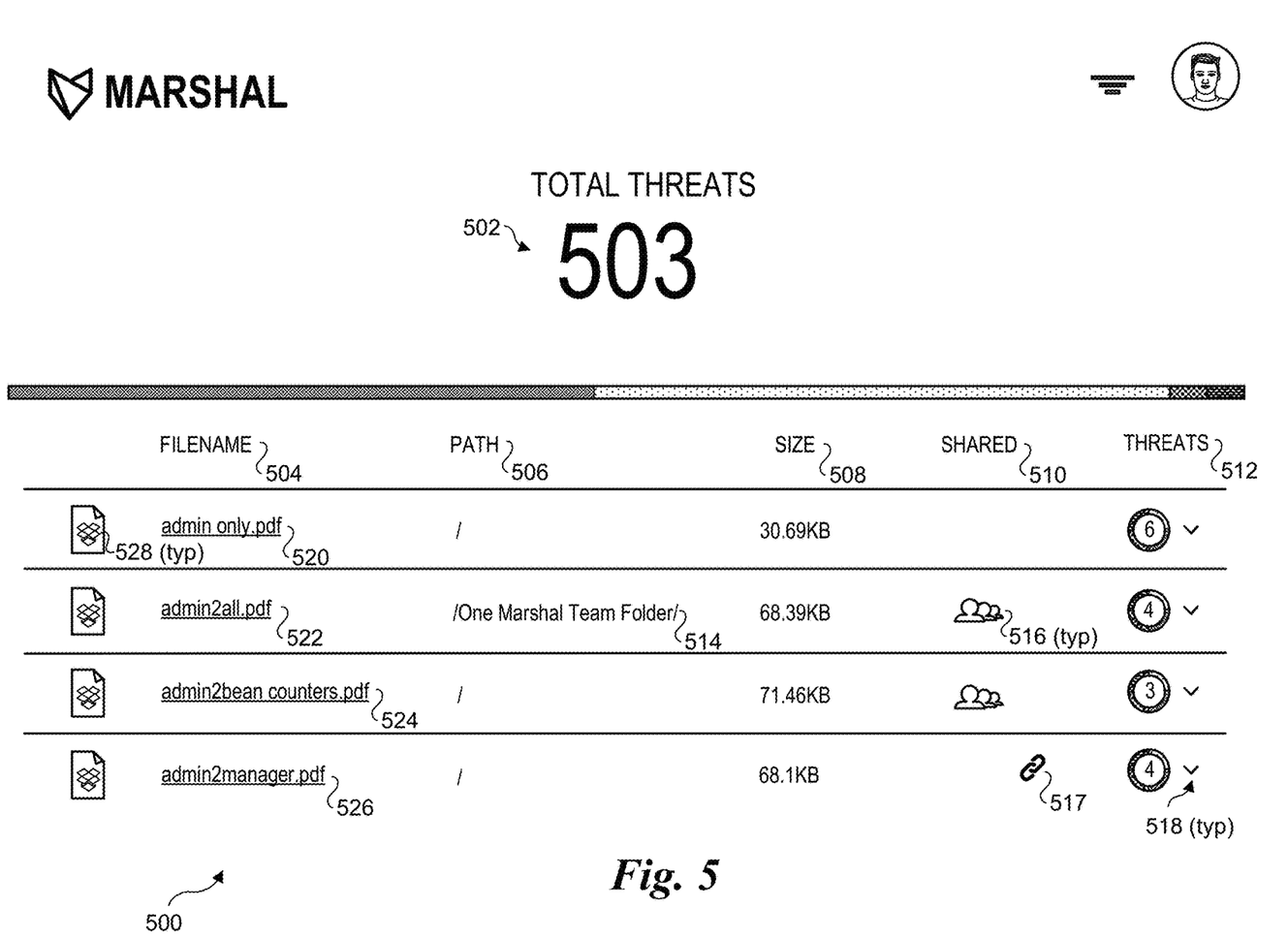
FIG. 5 is a first view of a scan result Web page that presents a list of documents for which threats have been detected in a tabular format, according to one embodiment.
Figure 6:
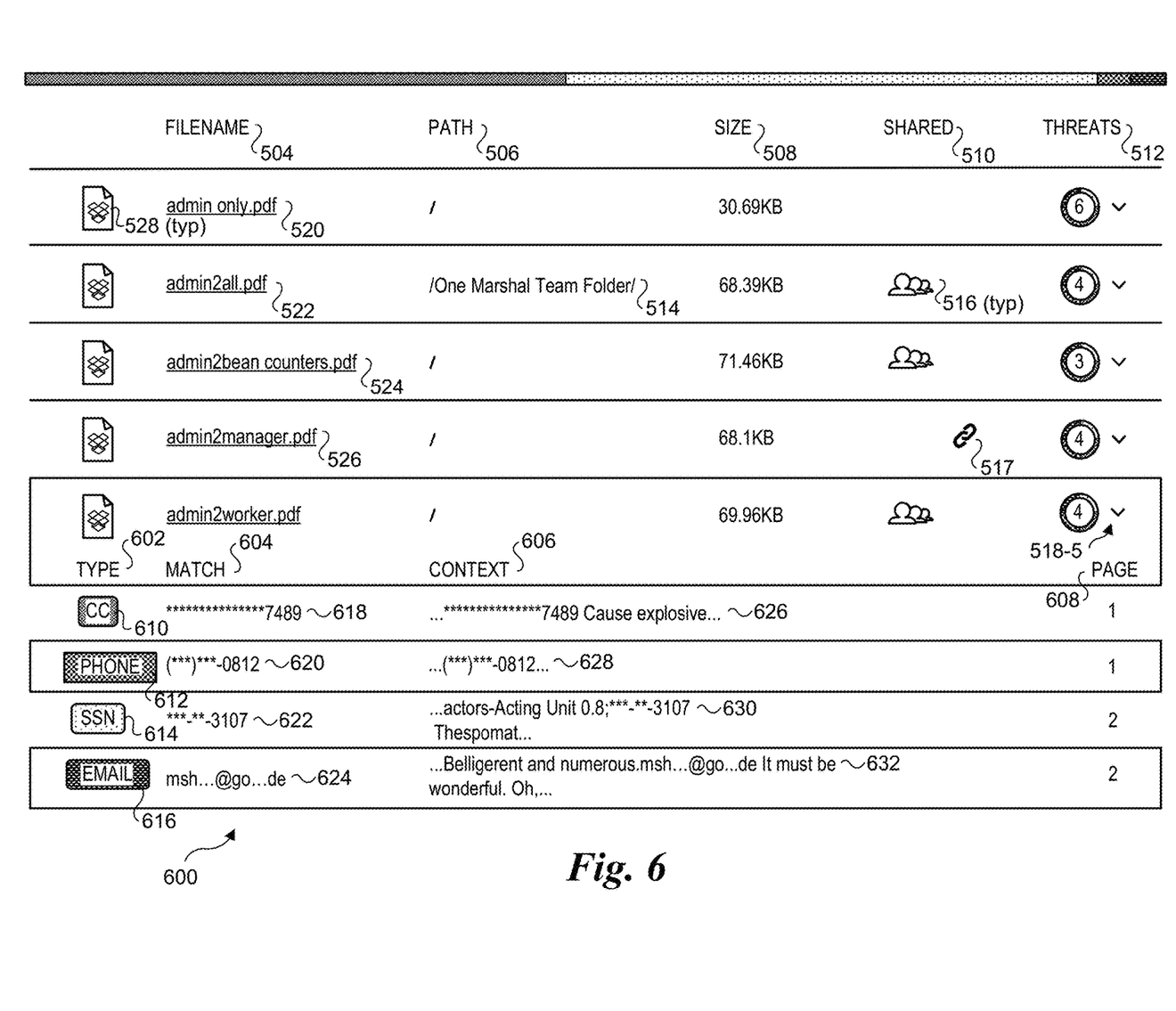
FIG. 6 is a second view of the scan result Web page illustrating presentation of threats in redacted form for one of the documents.

FIG. 5 is a view 500 of a Web page depicting the first portion of threats that were identified by an example scan. View 500 includes a number of total threats 502, followed by a table of threats including a filename column having a FILENAME header/control 504, a path column having a PATH header/control 506, a size column having a SIZE header/control 508, a shared column having a SHARED header/control 510, and a threats column having a THREATS header/control 512. The filename column lists the filename of each document (or file) identified as containing one or more threats. The path column identifies an optional relative path used by the service to store a corresponding file, as depicted by a path 514. The size column contains the size of each file. The shared column identifies whether the document is shared, as depicted by shared icons 516 and/or whether the file has been given a publicly accessible link, as depicted by a link icon 517. The threats column identifies the number of instances of personal threat data detected in each document, and includes a pulldown control 518 that expands the details of the personal threat data for a given document, as shown in FIG. 6.

In one embodiment, one or more of FILENAME header/control 504, PATH header/control 506, SIZE header/control 508, SHARED header/control 510, and THREATS header/control 512, enables the scan search results to be resorted based on the selected header/control. For example, the scan search results can be resorted based on the number of threats for each document by selecting THREATS header/control 512.

View 500 shows the first four documents of the example report, including documents 520, 522, 524, and 526. As depicted by a DROPBOX® icon 528, each of documents 520, 522, 524, and 526 is a document that is stored using DROPBOX®. In one embodiment, each filename is a link to the document with that filename, such that a user can access the document by selecting the link.

The first four search results are listed in FIG. 5 are shown in alphabetical order. However, this is merely one example of how search results may be ordered. In one embodiment, the user or an administrator of the third-party threat identification service can set a default search field on which to short, such as FILENAME shown in FIG. 5. For example, it might be preferable to see the documents sorted by the number of threats in each document in ascending order. In addition, in one embodiment, each of FILENAME header/control 504, PATH header/control 506, SIZE header/control 508, SHARED header/control 510, and THREATS header/control 512 operates as a sort control, such that selection of one or these header/controls will cause the search result to be sorted based on the field associated with the header control.

FIG. 6 is a view 600 of the Web page illustrating a second view of the threats that were identified by the example scan. In FIG. 6, the Web page has been scrolled down to show the first five threat results of the scan, with the fifth search result "expanded" by selection of a pulldown control 518-5 to show the individual threats for the fifth search result in redacted form. In the illustrated embodiment, expansion of a search result will cause a table to be generated including a TYPE column, a MATCH column, a CONTEXT column, and a PAGE column as depicted by a TYPE column header 602, a MATCH column header 604, a CONTEXT column header 606, and a PAGE column header 608. The TYPE column shows an icon illustrating the type of each threat, as depicted by a credit card (CC) icon 610, a phone icon 612, a social security number (SSN) icon 614, and an EMAIL icon 616.

The MATCH column contains a threat matching a search pattern and/or regex, where each threat is shown in a partially redacted form. The examples include a redacted credit card number 618 showing the last four digits of a credit card number, a phone number 620 showing a wildcard pattern of the phone number including the last four digits of the phone number, a social security number 622, showing a wildcard pattern of a social security number along with the last four digits of the social security number, and an email address 624 partially showing the alphanumeric characters that make up a phone number.

The CONTEXT column shows a snippet of the document including a local portion containing the redacted threat. This helps the user more easily identify the threat and its context without having to open the document. CONTEXT examples shown in FIG. 6 include a snippet 626 including redacted credit card number 610, a snippet 628 including redacted phone number 620, a snippet 630 including redacted social security number 622, and a snippet 632 including redacted e-mail 624. The PAGE column is used to display the page in the document the threat is located on.

In one embodiment, the expansion of a scan result is enabled through the use of JavaScript. In one embodiment, the JavaScript is embedded in the Web page when it is served to the user's client system. In another embodiment, an AJAX (Asynchronous JavaScript and XML) technique is used. Various AJAX frameworks may be implemented to support the AJAX functionality. In addition, other schemes may also be used, such as Node.js, which employs server-side scripting to generate page content. Generally, Node.js may be used to generate an original Web page or a revised Web page.

Figure 7:
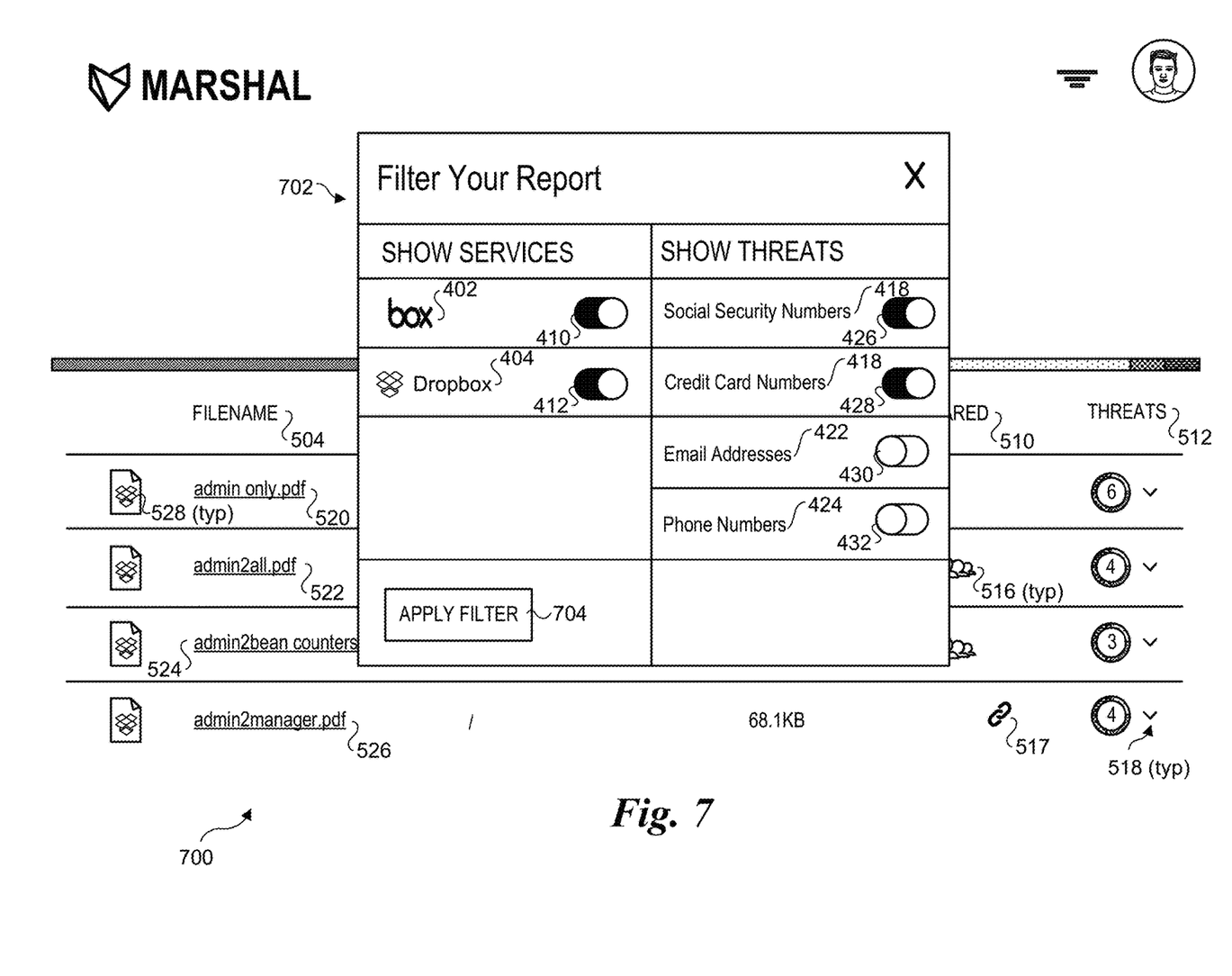
FIG. 7 is a third view of the scan result Web page that includes a dialog box that enables a user to filter the scan results.

As shown in a Web page view 700 of FIG. 7, users are enabled to filter their threat scan report results through use of a report filter dialog box 702. Generally, the report filter dialog box will show the same on/off controls that were turned on when the scan was configured (e.g., the same on-off controls shown in scan configuration dialog box 400 of FIG. 4, initially with all of the on-off controls set to the on position). Meanwhile, on-off controls for only the cloud storage services and threat types that were selected when originally setting up the report are shown. These will generally correspond to the cloud storage services having their corresponding on-off control set to on in the scan configuration dialog box, although it is possible that a cloud storage service on-off control can be set to 'on' and no threats are found for the service based on the types of threats that are chosen. A comparison between scan configuration dialog box 400 and report filter dialog box 702 show the GOOGLE DRIVE® and MICROSOFT® ONEDRIVE® cloud storage service options have been removed since they were turned off when the threat scan was originally performed.

In response to the user selecting an APPLY FILTER button 704, the original scan results are filtered based on the filter setting in report filter dialog box 702. In this example, on-off controls 430 and 432 corresponding to email addresses 422 and phone numbers 424 have been turned off. As a result, the prior search results will be filtered to no longer include any phone numbers or e-mail addresses.

Figure 8:
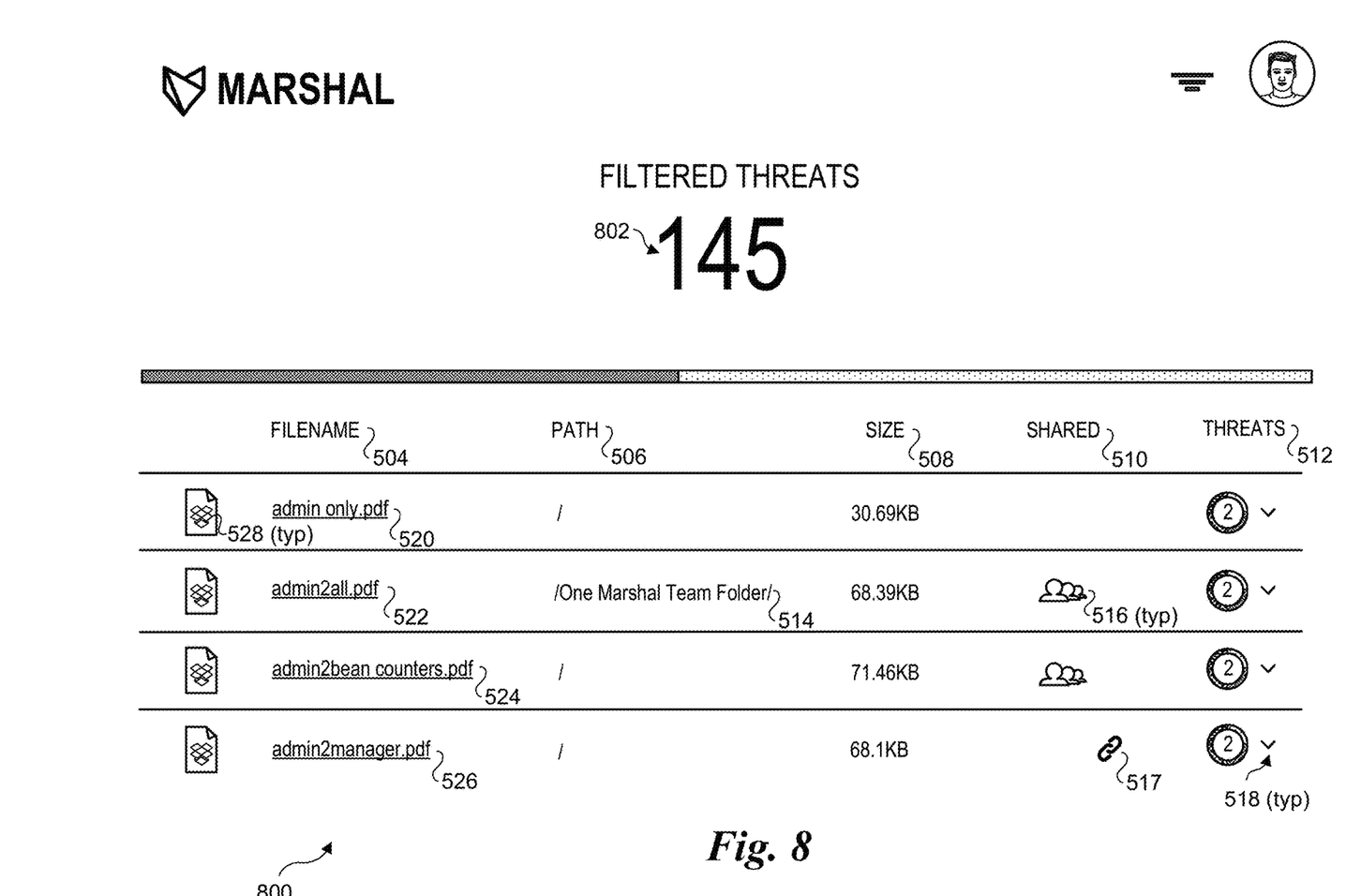
FIG. 8 is a view of a filtered scan result Web page showing a filtered list of documents with detected threats.

The result of the filtering operation is shown in a Web page view 800 of FIG. 8. As shown, the number of threats for each of documents 520, 522, 524, and 526 have been reduced to two threats each, and the number of filtered threats 802 has been reduced (relative to the unfiltered threats) from 503 to 145. As with Web page view 500, Web page view 800 enables a user to open a document (via its underlying link) by selecting the document, and the user is able to sort the filtered threats using the table header/controls 504, 506, 508, 510, and 512.

The techniques disclosed herein enable users to have their documents on cloud-based storage services scanned for threats in a manner that does not expose the threats to outside attacks. Significantly, threats are not stored in non-volatile storage on any of the servers in their full format (i.e., un-redacted form). In addition, the documents themselves are never stored in full format on any of the servers used to facilitate the threat scanning and Web page presentation operations, including never being stored in memory. Rather, documents are scanned for threats using the streamed document content that is received from their host cloud-based storage services in combination with partitioning the streamed content into paragraphs or chunks as it is received, meaning only a portion (such as the paragraphs or chunks) of a document is stored in memory at any given point in time.

By only storing portions of documents in volatile memory (temporaneously), any motivation to attempt to hack the data is greatly reduced. Among other things, it is much more difficult to maliciously access data stored in memory on a server, in comparison to accessing data stored in non-volatile storage, such as a mass storage device. In addition, in view of recently introduced memory technologies such a secure enclaves, malicious attacks intending to access data stored in memory are not even possible (external code is physically prevented from accessing data stored in a secure enclave).

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. The terminology "communicatively coupled" means that two or more elements are enabled to communicate overall some form of communication path, which may include a direct connection or elements connected via one or more networks. For example, servers and other computing devices (e.g., desktop computers, laptops, notebooks, Chromebooks, mobile phones, tablets, etc.) that are connected to the Internet and employ a network communication protocol such as HTTP, HTTPS, TCP/IP, FTP, or other network protocols are considered to be communicatively coupled within the scope of the claims. Similarly, such computing devices may be communicatively coupled via a local area network (LAN) or wide-area network (WAN).

In addition, the various servers and components described herein may be implemented in virtualized environments, and may be deployed as virtual machines or containers in such environments that may be communicatively coupled to other virtual machines or containers via virtual LANs (vLANs) or the like, as well as communicatively coupled to physical machines over a network. Generally, such virtualized environments may employ one or more of Type-1 hypervisor, Type-2 hypervisor, and container-based architectures.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic, a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for detecting and presenting personal threat data in documents stored by third-party cloud-based storage services, comprising:
    enabling, via a user interface, a user to request to have documents associated with the user that are stored on one or more third-party cloud-based storage services to be scanned for personal threat data,
    for each of the one or more third-party cloud-based storage services,
        requesting access to the documents associated with the user of the cloud-based storage service that are stored on the cloud-based storage service;
        receiving content corresponding to the documents from the third-party cloud-based storage service as one or more streams;
        for each of the one or more streams,
            scanning the content within the stream to detect one or more types of personal threat data; and
            presenting the personal threat data that are detected in a redacted form via the user interface, wherein the detecting of the personal threat data within the stream and the presenting of the detected personal threat data in redacted form are performed without storing any of the documents in their entirety in memory or non-volatile storage.

2. The method of claim 1, wherein the one or more types of personal threat data are detected and presented without storing any detected threat in an un-redacted form in non-volatile storage.

3. The method of claim 1, wherein the method is implemented using a Web service, further comprising:
    enabling, via one or more Web pages, a user to select one or more third-party cloud-based storage services used by the user to store documents to be scanned; and
    presenting the personal threat data in redacted form via one or more Web pages.

4. The method of claim 3, further comprising:
    presenting a threat scan result Web page listing a plurality of documents for which one or more instances of personal threat data have been detected; and
    enabling a user, via a user input to the threat scan result Web page, to view, in redacted form, instances of personal threat data detected for individual documents among the plurality of documents.

5. The method of claim 1, wherein the one or more streams comprise one or more Bytestreams, further comprising:
    for each Bytestream,
    scanning content within the Bytestream using one or more scanners, the scanners configured to detect instances of personal threat data by matching the content with one or more predefined patterns;
    for each instance of personal threat data that is detected, generating a redacted form of the personal threat data; and
    storing the redacted form of the personal threat data.

6. The method of claim 5, further comprising:
    for each Bytestream,
        breaking the Bytestream into a plurality of work units; and
        for each work unit,
            parsing textual content in the work unit using one or more means for pattern matching configured to detect textual content matching one or more predefined patterns.

7. The method of claim 6, wherein the means for pattern matching include one or more regexes, further comprising:
    detecting a match for a given regex; and
    validating the match.

8. The method of claim 1, whether the redacted form of personal threat data includes a snippet of text surrounding a threat fragment.

9. The method of claim 1, further comprising enabling the user, via the user interface, to access a document containing one or more instances of personal threat data, wherein the document is accessed from the third-party cloud-based storage service used to store the document.

10. The method of claim 1, further comprising:
    presenting a first set of threat scan results comprising a first list of documents for which one or more instances of personal threat data are detected based on an initial set of inputs selected by the user;
    enabling the user to filter the first set of threat scan results using a filter set of inputs; and presenting a filtered set of threat scan results comprising a second list of documents for which one or more instances of personal threat data are detected based on the filter set of inputs.

11. The method of claim 1, wherein the one or more types of personal threat data include one or more of the group consisting of social security numbers, credit card numbers, e-mail addresses, and phone numbers.

12. A system for detecting and presenting personal threat data in documents stored by third-party cloud-based storage services, comprising:
one or more frontend servers, operatively coupled to one or more third-party cloud-based storage services;
one or more application servers, communicatively-coupled to the one or more third-party cloud-based storage services and the one or more frontend servers; and
one or more scanners, operatively coupled to the one or more third-party cloud-based storage services
wherein the system is configured to:
enable, via one or more Web pages served by the one or more frontend servers, a user to request to have documents associated with the user that are stored on the one or more third-party cloud-based storage services to be scanned for personal threat data,
for each of the one or more third-party cloud-based storage services identified in the request,
request access to the documents associated with the user that are stored on the cloud-based storage service;
receive, at one or more scanners, content corresponding to the documents from the third-party cloud-based storage service as one or more streams;
for each of the one or more streams,
scan, via the one or more scanners, the content within the stream to detect one or more types of personal threat data; and
enable, via one or more Web pages served by a frontend server, the user to view the personal threat data that are detected in redacted forms, wherein the system detects and presents personal threat data in documents accessed from the cloud-based storage service without storing any of the documents in their entirety in memory or non-volatile storage on any of the one or more front-end servers, the one or more application servers, and the one or more scanners.

13. The system of claim 12, further comprising:
a database,
wherein the system is further configured to store personal threat data that are detected in redacted forms in the database.

14. The system of claim 12, wherein the system includes one or more non-volatile storage devices, and wherein the system is configured to never store a detected threat in an un-redacted form in any of the non-volatile storage devices.

15. The system of claim 12, further configured to:
serve a threat scan report Web page listing a plurality of documents for which one or more instances of personal threat data have been detected; and
enable a user, via a user input to the threat scan report Web page, to view, in redacted form, instances of personal threat data detected for individual documents among the plurality of documents.

16. The system of claim 12, further configured to:
serve a threat scan result Web page listing a plurality of documents for which one or more instances of personal threat data have been detected, wherein at least a portion of the plurality of documents in the list include links that enable the user, upon selection of a link for a given document, to access the given document, wherein the document is accessed from the third-party cloud-based storage service used to store the document.

17. The system of claim 12, wherein the one or more streams comprise one or more Bytestreams, the system further configured to:
for each Bytestream,
scan content within the Bytestream using one or more scanners, the scanners configured to detect personal threat data by matching the content with one or more predefined patterns;
for each threat that is detected,
generate a redacted form of the threat.

18. The system of claim 17, wherein a scanner is further configured to:
break a Bytestream into a plurality of work units; and
for each work unit,
parse textual content in the work unit using one or more regexes configured to detect textual content matching one or more predefined patterns.

19. The system of claim 18, wherein the scanner is further configured to:
detect a match for a given regex; and
validate the match.

20. The system of claim 12, whether the redacted form of an instance of personal threat data includes a snippet of text surrounding a threat fragment.

21. The system of claim 12, further configured to:
serve a first Web page configured to cause a browser to display an initial set of personal threat data scan results comprising a first list of documents for which one or more instances of personal threat data are detected based on an initial set of inputs selected by the user;
enable the user, via either the first Web page or a second Web page, to filter the first set of personal threat data scan results using a filter set of inputs; and
serve a third Web page configured to cause the browser to display a filtered set of personal threat data scan results comprising a second list of documents for which one or more instances of personal threat data are detected based on the filter set of inputs.

* * * * *